United States Patent [19]

Le Van

[11] 4,339,920
[45] Jul. 20, 1982

[54] METHOD AND APPARATUS UTILIZING THE WEIGHT OF MOVING TRAFFIC TO PRODUCE USEFUL WORK

[76] Inventor: Wayne P. Le Van, 310 E. 44th St., New York, N.Y. 10017

[21] Appl. No.: 163,936

[22] Filed: Jun. 27, 1980

[51] Int. Cl.³ .............................................. F03G 5/00
[52] U.S. Cl. ........................................ 60/533; 60/413; 417/229
[58] Field of Search .................... 60/413, 533, 668; 417/229; 138/30

[56] References Cited

U.S. PATENT DOCUMENTS

| | | | |
|---|---|---|---|
| 3,353,787 | 11/1967 | Semo | 60/325 |
| 3,918,844 | 11/1975 | Bailey | 417/229 |
| 4,001,597 | 1/1977 | Graff | 417/229 X |
| 4,004,422 | 1/1977 | Le Van | 60/533 |
| 4,081,224 | 3/1978 | Krupp | 417/229 |
| 4,166,478 | 9/1979 | Sugimura et al. | 138/30 |
| 4,173,431 | 11/1979 | Smith | 417/229 |
| 4,212,598 | 7/1980 | Roche et al. | 417/229 |

Primary Examiner—A. Michael Chambers
Attorney, Agent, or Firm—Arthur T. Fattibene

[57] ABSTRACT

A method and apparatus which includes locating a compressible chamber filled with a non-compressible fluid confined in a closed circuit in the path of moving traffic so that the weight of the traffic passing over the chamber will affect a displacement of the incompressible fluid to create a fluid flow through the circuit. The circuit includes unidirectional flow control valves for directing the flow of displaced fluid through a fluid motor connected in circuit with the compressible chamber. Disposed in the circuit is a rectifier for rectifying the intermittent displacement of the fluid into a generally uniform fluid flow to affect the drive of the fluid motor with the output of the fluid motor being translated into useful work.

3 Claims, 5 Drawing Figures

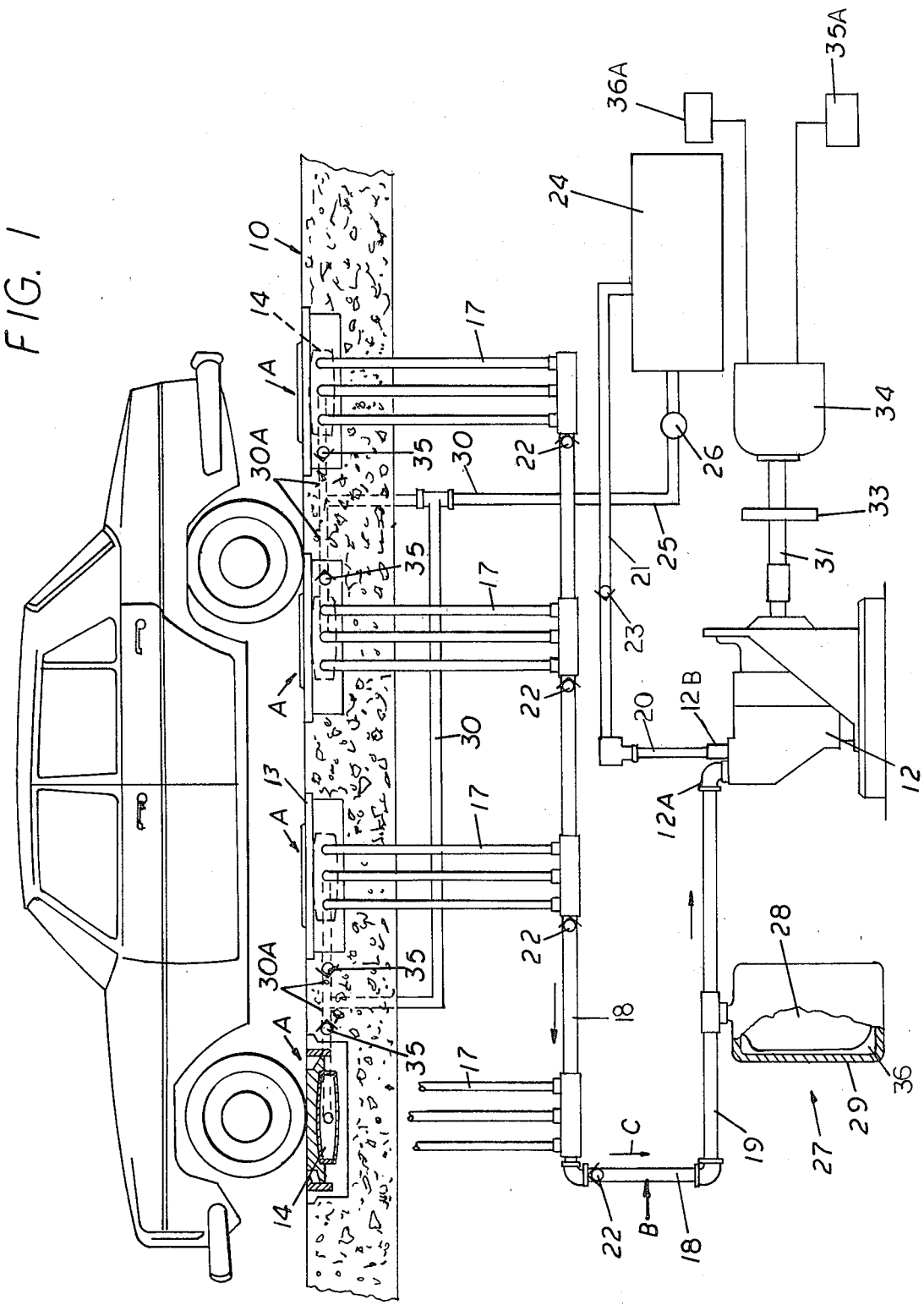

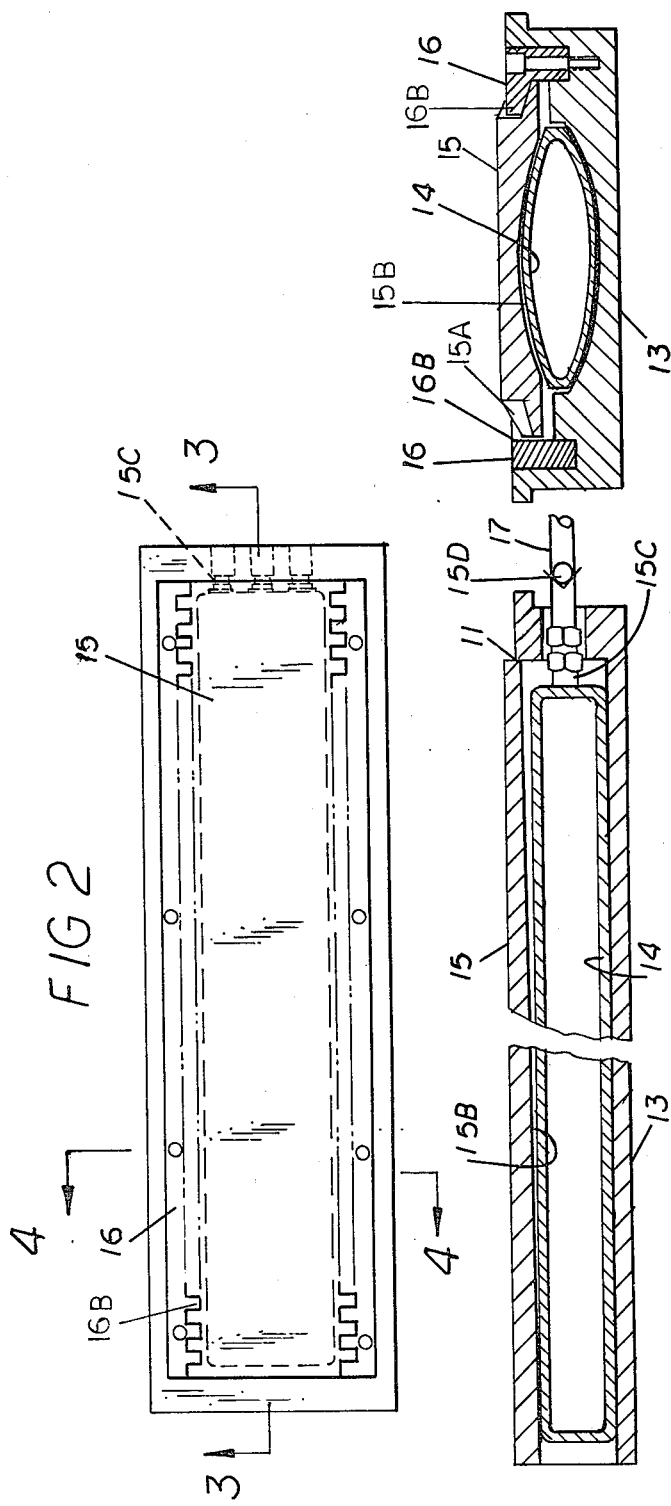

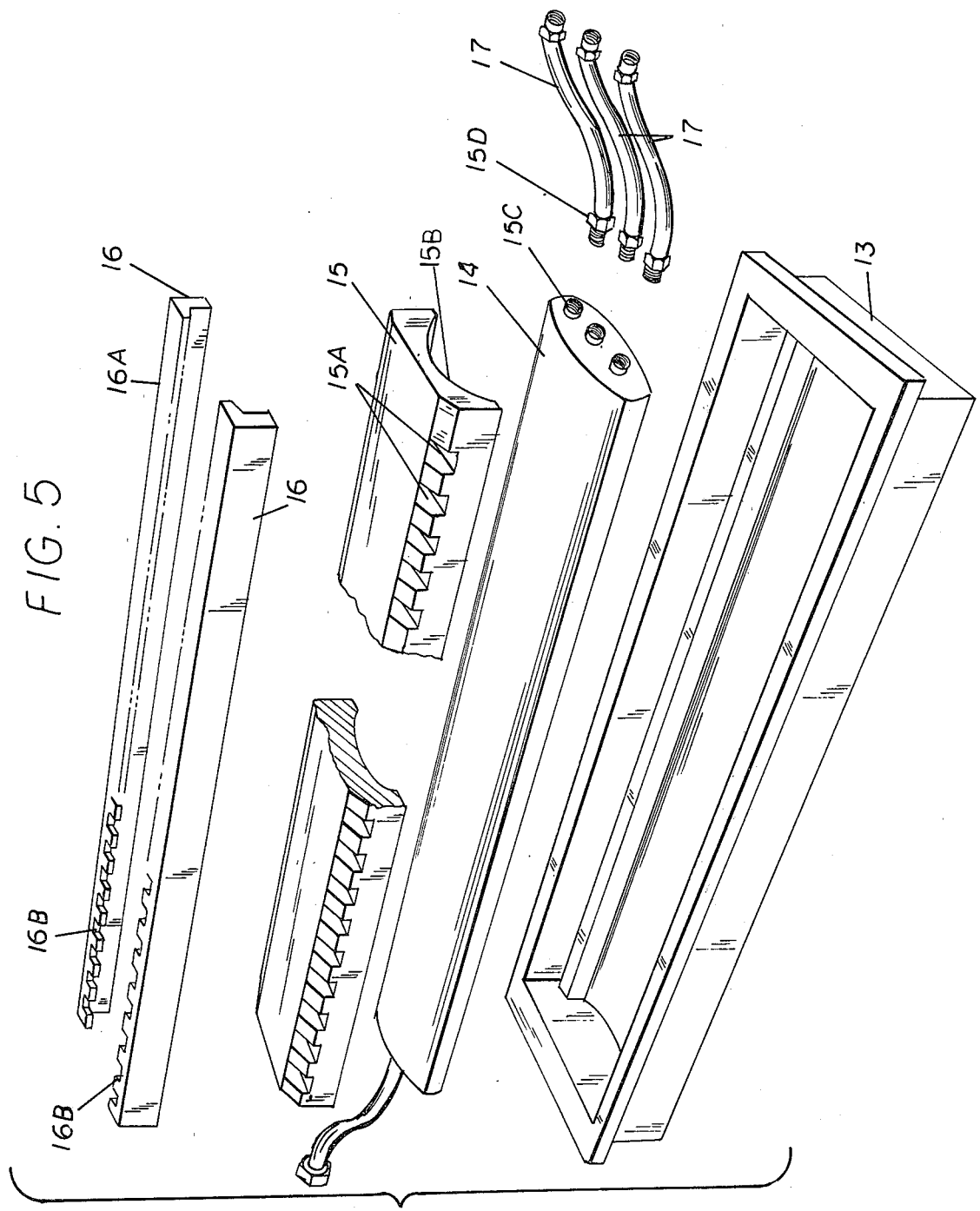

METHOD AND APPARATUS UTILIZING THE WEIGHT OF MOVING TRAFFIC TO PRODUCE USEFUL WORK

RELATED PATENTS

This application is directed to improvements to the method and apparatus of the type disclosed in my prior U.S. Pat. Nos. 3,944,855 and 4,004,422.

PRIOR ART

In view of the present day ever increasing energy crisis, various efforts have been made to utilize the natural and created forces such as wind, water, solar, nuclear and steam power to generate electrical and/or mechanical energy which can then be translated by various means into useful work. Virtually untapped is the utilization of other sources and forms of man made potential energy. One such source of potential energy is the vast amount of traffic generated by constant streams of moving vehicles along the numerous streets and highways. The potential energy of such moving traffic is virtually lost, as little if any effort has been made to harness the potential energy which exists in the flow of constantly moving traffic. A method and apparatus for harnessing and translating the potential energy of such moving traffic into useful kenetic energy is disclosed in each of my prior U.S. patents hereinabove set forth.

OBJECTS

An object of this invention is to provide a method and apparatus whereby the potential energy of moving traffic can be translated into a generally uniform useful flow of kenetic energy which can then be readily translated into useful work.

Another object is to provide a method and apparatus whereby the potential energy of moving traffic can be readily transformed into useful kenetic energy.

Another object is to provide a method and apparatus for translating the potential energy of moving traffic into useful kenetic energy in a relatively simple, expedient and positive manner.

BRIEF SUMMARY OF THE INVENTION

The foregoing objects and other features and advantages of this invention are attained by a method of translating the potential energy of a moving mass of traffic by affecting the displacement of a non-compressible fluid disposed in a close circuit by utilizing the weight of the moving traffic, and directing the displacement fluid in a unidirectional endless flow path. Disposed in the flow path of the displaced fluid is a fluid motor which is driven by the displaced fluid flowing therethrough. As the flow of traffic affects an intermittent displacement of fluid, the flow of the displaced fluid is rectified into a generally uniform steady flow state so that the fluid motor will operate with a minimum of speed fluctuations. The output shaft of the fluid motor in turn is drivingly connected to an electric generator or other suitable work producing machine. When the fluid motor is utilized to drive an electric generator, the electrical energy thus produced can either be stored in the bank of batteries, hooked into the grid of a local power station or directed to a desired point of use.

An apparatus by which the method may be carried out comprises one or more chambers having a flexible wall portion which are disposed in a roadway or traffic lane so that the weight of the moving traffic passing thereover will cause the chamber to periodically compress under the weight of the moving traffic and passing thereover, and to resume its normal position after the weight has been removed. The respective collapsible chambers are connected in circuit by suitable connecting conduits so as to define an endless flow path for the displaced fluid. The chambers and conduits are filled with an incompressible fluid so that upon the compression of the chambers, the fluid therein will be displaced and caused to flow through the circuit.

Positive displacement of the fluid is effected by a hit plate having an inclined surface associated with the flexible wall portion which is inclined in the direction of flow so that when the hit plate is displaced by the weight of the moving traffic, the compression of the chamber is such that the fluid is positively displaced toward the chamber outlet. To insure the desired directional flow of the fluid through the circuit upon the positive initial displacement thereof there are disposed in the circuit a series of unidirectional flow valves. Also connected in circuit is a fluid motor which is arranged to be driven by the flow of fluid created by the periodic displacement of the fluid from the compressible chambers.

Between the chambers and the inlet to the fluid motor there is provided a rectifier which functions as a self pressurizing accumulator to transform the periodic displacement of the fluid into a generally stable or constant flow of fluid to the fluid motor. This is attained by the accumulator being formed as a flexible container connected in communication with the fluid circuit to receive the diplaced fluid. The flexible container of the accumulator is confined in a closed housing in spaced relationship thereto and the arrangement is such that the flexible container is expandible within its housing as it receives the displaced fluid. In expanding, it will compress the confined air in the air space within the housing. In doing so, the fluid accummulating in the flexible container is maintained under a predetermined pressure which will function to establish a steady fluid flow through the motor. A suitable pressure actuated valve is provided to insure the maintenance of the desired pressure within the rectifier so as to attain the desired stable fluid flow to the fluid motor. The output of the motor is suitably connected to a generator or other work producing machine.

FEATURES

A feature of this invention resides in the provision of a fluid circuit in which a fluid flow therethrough is established by the weight of moving traffic and which flow is rectified so that a generally stable and continuous fluid flow is achieved to drive a fluid motor.

Another feature resides in the provision of translating the unused potential energy of moving traffic into useful kenetic energy by utilizing the weight of the moving traffic for effecting the displacement of an incompressible fluid to drive a fluid motor.

Another feature resides in the provision of an unidirectional flow control valves in the fluid circuit to control the direction of fluid flow therethrough.

Another feature resides in the provision as a hit plate construction which will insure initial positive displacement of the incompressible fluid toward the outlet of the flexible chamber upon compression thereof.

Another feature resides in the provision of a fluid flow circuit which includes a self pressurizing rectifier for translating a periodic fluid displacement into a generally constant fluid flow.

Other features and advantages will become more readily apparent when considered in view of the drawings and specifications in which:

FIG. 1 is a side view of an apparatus embodying the invention with parts thereof shown in section.

FIG. 2 is a detail plan view of the hit plate assembly.

FIG. 3 is a cross sectional view of the hit plate assembly taken along line 3—3 on Figure.

FIG. 4 is a detail section view taken along line 4—4 on FIG. 2.

FIG. 5 is an exploded perspective view of the hit plate assembly.

DETAILED DESCRIPTION

This invention is directed to a method of utilizing the heretofore wasted potential energy of moving traffic to produce useful work, e.g. to generate electricity and/or to operate other work producing machines. This is attained by locating in the road bed or traffic lane 10 one or more collapsible chambers 14 which are adapted to be filled with an incompressible fluid or hydraulic oil and which are connected in circuit to a fluid motor 12. The traffic, e.g. a car or other vehicle in passing over the roadway causes the collapsible container 14 to be compressed thereby displacing the incompressible fluid contained therein. The fluid thus displaced is directed to the fluid motor 12 to effect the drive thereof. The method further contemplates that the displaced fluid is caused to be displaced in a unidirectional manner with the periodic fluid displacement being rectified to provide a generally stable or constant fluid flow to drive the fluid motor.

Referring to FIG. 1, the apparatus by which the method may be performed comprises a roadway or traffic lane 10 in which there is disposed at spaced intervals therealong a movable hit plate assembly A. As best seen in FIGS. 2 to 5, the hit plate assembly comprises a frame 13 which is embedded in the roadway 10. As noted, the frame 13 is generally dish shaped and defines a recepticle for receiving a flexible or collapsible chamber 14. The chamber is suitably formed of a flexible material which will collapse under the weight of a vehicle passing thereover. Disposed above the flexible chamber 14 is a hit plate 15 which is arranged to be engaged by the vehicle or traffic passing over the roadway 10. A pair of retainer bars 16—16 retain the hit plate to its base frame 13 in a manner so as to provide relative limited vertical movement between the hit plate 15 and its base frame 13. As best seen in FIGS. 2, 3 and 5, this is attained by providing the horizontal flange portion 16A of the respective retainer bars 16 with a series of spaced notches which define therebetween a series of spaced teeth-like projections 16B. The hit plate 15 in turn has spaced along the longitudinal marginal edge thereof a series of notches 15A which in the assembled position are adapted to receive the corresponding teeth projections 16B of the retainer bars 16. As best seen in FIG. 3, the hit plate 15 is retained relative to the base frame in a manner to provide relative limited movement therebetween. Also as shown in FIG. 2, the complementary under surface 15B of the hit plate 15 is inclined or tapered in the direction of fluid out 15C of the chamber. The bottom of the base frame 13 conforms closely to the bottom of the chamber 11.

The inclined bottom surface 15B of the hit plate upon displacement under the weight of the moving traffic thereover will effect an initial positive displacement of the incompressible fluid therein toward the chamber outlet 15C. Disposed in communication to the chamber outlet 15C is a one-way valve 15D. While the illustrated embodiment discloses the under surface 15B of the hit plate inclined, it will be understood that the bottom of the frame 13 or both the under surface 15B and the bottom of the frame 13 may be tapered or inclined so as to direct the displaced fluid toward the chamber outlet 15C when the hit plate 15 is displaced under the weight of the moving vehicle.

Each of the respective chambers 14 are connected in circuit by one or more couplers 17 to a common collecting branch 18 which in turn connects with the inlet 12A of the fluid motor 12. The outlet 12B of the fluid motor is connected to a return line 20 which is connected to line 21 for returning the fluid or oil to a supply reservoir 24.

As shown in FIG. 1, the collecting branch 18 is provided at spaced intervals therealong with a series of one-way valves 22. The respective one-way valves 22 are located immediately down-streamwise from the connections which the respective couplers 17 make with the branch line 18. The arrangement is such that the fluid displaced from the chambers 14 as will be hereinafter described will be positively directed to the inlet 12A of the fluid motor 12.

The return line 21 also includes a one-way valve 23. Valves 23 function to permit the return fluid to flow into the reservoir or supply 24 and thereby prevent any back flow of fluid to the motor 12.

It will be understood that each of the collapsible containers 14 and connected circuit lines 17, 18, 19, 20 & 21 are at all times maintained completely filled with an incompressible hydraulic fluid. This is attained by a reservoir supply 24 of such fluid which is connected to each of the chambers 14 by a supply line 25. A pump 26 disposed in the supply line 25 insures that the circuit described is properly supplied with fluid at all times. As shown in FIG. 1, the outlet of pump 26 is connected to a supply manifold 30 which is connected by a branch 30A to the respective chambers 14. Disposed in each branch 30A is a pressure actuated one-way valve 35. The arrangement is such that whenever the incompressible fluid is displaced from its respective chamber, as when a vehicle passes thereover, the reduction of pressure therein will cause valve 35 to open thereby causing the pump 26 to send make up fluid into the chamber 14 which was evacuated. When the evacuated chamber is filled with the desired amount of fluid to assume its normal inoperative position, the valve 35 closes whereby the system is then maintained under pressure until one of the chambers is again compressed.

Included in the circuit B is a rectifying means 27 which functions to level off the impluses or intermittent displacement of the fluid from chambers 14 so that a generally constant fluid flow is directed to the inlet 12A of the fluid motor. The rectifying means comprises a container 28 formed of an expandable material and which is connected in communication with line 19 upstreamwise from the inlet 12A. The expandable container 28 thus functions as an accumulator for receiving and storing a portion of the displaced fluid. As shown, the expandable container is housed in a rigid closed housing 29 so as to define a confined air space 36 around the expandable container 28 within the housing 29. The arrangement is such that as the expandable container 28 receives the displaced fluid it will expand thereby causing the air in air space 36 to be compressed to render the rectifier means 27 self pressurizing. It will be understood that suitable pressure relief valves may be provided to regulate the pressure of the air space 36.

In operation, with the circuit B properly charged with incompressible fluid from the reservoir 24, each time moving traffic engages the hit plate 15 of the respective hit plate assemblies located in the roadway 10, the weight of the moving mass of traffic will cause the hit plate 15 to be depressed thereby compressing chamber 14 causing the fluid therein to be displaced in the direction of the chamber outlet 15C. The successive actuations of the respective hit plates 15 thus creates a series of impluses which generates an intermittent fluid flow in circuit B, the frequency of the impluses being dependent upon the rate of flow of traffic along the roadway. To smooth out the flow, the displaced fluid is collected in the accumulator or rectifier 27 and which will tend to stabilize the flow to the motor 12 so that a generally steady flow of displaced fluid is directed to the inlet of the fluid motor 12. As the fluid passes through the fluid motor, it is returned via lines 20 and 21 to the reservoir 24, from whence it is pumped as required by pump 26 to each of the respective chambers.

Connected to the output shaft 31 of the fluid motor is a flywheel 33, generator 34 or other work producing machine for translating the kenetic energy thus produced into useful work. When the output of the fluid motor 12 is used to drive a generator, it will be understood that the current generated can be either stored in batteries 35A, hooked into the grid of a local power station 36A, or directed to a point of use.

While the invention has been described with respect to a particular embodiment thereof, it will be readily appreciated and understood that variations and modifications may be made without departing from the spirit or scope of the invention.

I claim:

1. An apparatus for translating the energy of moving traffic into useful work comprising:
   a plurality of chamber, each having a fluid inlet and outlet, and each having a flexible wall portion disposed in the path of moving traffic at spaced apart intervals,
   a circuit means,
   each of said, chambers being connected into communication with said circuit means,
   said circuit means defining a closed circuit, said chambers and connected circuit means being filled with a non-compressible fluid,
   said circuit means including a reservoir for containing a supply of said non-compressible fluid, means connecting said reservoir in circuit with each of said chambers,
   a fluid motor,
   said motor having a fluid inlet and a fluit outlet connected in circuit to said closed circuit, said motor outlet being connected in communication with said reservoir,
   unidirectional flow control means disposed in said closed circuit for directing the flow of fluid through said circuit in a unidirectional manner from each of said respective chambers, and toward and through said fluid motor,
   rectifying means connected in said circuit between the respective outlets of said chambers and the inlet to said motor whereby said rectifying means functions to rectify intermittent displacement of the fluid from said chambers to a generally uniform flow through said motor,
   said rectifying means including a flexible container to define an expandible chamber,
   said expandible chamber being connected in communication with said circuit means,
   a rigid housing encasing said flexible container in spaced relationship thereto so as to define a closed air space therebetween so that said rectifying means functions as a self pressurizing accumulator for said circuit whereby the intermittent displacement of the non-compressible fluid in said chamber is rectified into a generally uniform fluid flow through said motor, said housing including a frame disposed in the path of moving traffic defining a base plate for supporting each of said chambers, a hit plate disposed over each of said flexible chambers for movement toward and away from its respective base plate whereby said chamber is compressed by the weight of the moving traffic passing thereover to affect displacement of fluid therefrom, one of said plates having an inclined surface disposed contiguous to said surface, said inclined surface being inclined in the direction of said outlet so that when said surface is displaced relative to said chamber, the fluid therein is positively displaced in the direction of said outlet, retainer means for movably retaining said hit plate to said frame, and means adding make-up fluid to said circuit,
   and an electrical generator operatively connected to said fluid motor to be driven thereby.

2. An apparatus for converting the potential energy of moving traffic into useful work comprising:
   a chamber having a flexible wall portion adapted to be disposed in the path of moving traffic so as to be periodically collapsed by the weight of the traffic each time such traffic passes thereover, said chamber having a fluid outlet, and a fluid inlet,
   a circuit including a fluid motor connected in communication to the outlet of said chamber, said fluid motor having a fluid inlet and a fluid outlet,
   a reservoir adapted to contain a supply of incompressible fluid connected to the outlet of said fluid motor,
   a supply line connecting said reservoir in communication with the fluid inlet of said chamber,
   and a pump connected to said supply line for supplying said chamber with make-up fluid upon the fluid being displaced therefrom;
   unidirectional valve means disposed in said circuit for directing the displaced fluid from said chamber to said fluid motor,
   and a unidirectional pressure actuated valve disposed in said supply line for controlling the flow of make-up fluid to said chamber and including a housing for said chamber,
   said housing including a base frame member, said chamber being disposed in said base frame member,
   a hit plate member disposed over said chamber, said hit plate member being connected for limited movement relative to said base frame member so as to compress the chamber therebetween, one of said members having a inclined surface disposed contiguous to said chamber,
   and said inclined surface being inclined in the direction of said outlet so that when said surface is displaced relative to said chamber, said fluid is positively displaced in the direction of the chamber outlet, and a rectifying means disposed in said circuit upstreamwise from said fluid motor for receiving the periodically displaced fluid from said chamber as displaced by the moving traffic and imparting to said periodically displaced fluid a generally uniform fluid flow to said motor.

3. An apparatus as defined in claim 1 wherein said rectifying means includes an expandible accummulator connected in said circuit for accummulating the fluid displaced by said chamber, a housing enclosing said expandible accummulator with an air space as disposed therebetween, so that the air in said space is compressed upon the expansion of said accummulator whereby said accummulator is rendered self pressurizing for stabilizing the fluid flow to said motor.

* * * * *